United States Patent [19]

Kumar

[11] Patent Number: 5,896,021
[45] Date of Patent: Apr. 20, 1999

[54] REMOVAL OF MOISTURE FROM INDUCTION MOTORS

[75] Inventor: Ajith Kuttannair Kumar, Erie, Pa.

[73] Assignee: General Electric Company, Erie, Pa.

[21] Appl. No.: 08/905,622

[22] Filed: Aug. 4, 1997

Related U.S. Application Data

[60] Provisional application No. 60/038,038, Feb. 6, 1997.

[51] Int. Cl.[6] .............................. H02H 7/08; H02P 7/00; H02K 3/24
[52] U.S. Cl. ..................... 318/775; 318/436; 318/471; 310/208
[58] Field of Search ........................ 318/138, 139, 318/245, 254, 280–283, 430–480, 770–832; 310/208, 64, 259; 361/20–36

[56] References Cited

U.S. PATENT DOCUMENTS

| | | | |
|---|---|---|---|
| 3,890,551 | 6/1975 | Plunkett | 318/376 |
| 3,967,173 | 6/1976 | Stich | 318/227 |
| 4,032,831 | 6/1977 | Nabae et al. | 363/2 |
| 4,066,938 | 1/1978 | Turnbull | 318/227 |
| 4,672,286 | 6/1987 | Williams | 318/798 |
| 4,716,515 | 12/1987 | Alexander | 363/138 |
| 4,990,844 | 2/1991 | Gritter et al. | 318/762 |
| 5,164,626 | 11/1992 | Oigawa | 310/208 |
| 5,280,228 | 1/1994 | Kanouda et al. | 318/803 |
| 5,627,447 | 5/1997 | Unsworth et al. | 318/801 |
| 5,708,336 | 1/1998 | Eyerly et al. | 318/436 |
| 5,712,540 | 1/1998 | Toda et al. | 318/46 |

*Primary Examiner*—Paul Ip
*Attorney, Agent, or Firm*—Ann M. Agosti; Marvin Snyder

[57] ABSTRACT

A method for removing moisture from an induction motor having at least two phase windings with each phase winding coupled by a first respective parallel combination of a first switch and a first diode to a positive voltage line and a second respective parallel combination of a second switch and a second diode to a negative voltage line includes supplying voltage to the positive and negative voltage lines and switching ON and OFF selected ones of the first and second switches to provide a current to preheat the induction motor. The provided current can be a substantially DC current or a substantially sinusoidal current.

15 Claims, 4 Drawing Sheets

5,896,021

REMOVAL OF MOISTURE FROM INDUCTION MOTORS

This application is a continuation of provisional application, Serial No. 60/038,038 filed Feb. 6, 1997.

BACKGROUND OF THE INVENTION

Transit cars conventionally include multiple train-lined cars supplied by a common power source. Each car includes multiple motors with each motor driving an axle. For AC (alternating current) propulsion applications, these motors are generally induction motors that are controlled by PWM (pulse width modulating) inverters. These variable frequency, variable voltage inverters are fed with DC (direct current) voltage either from a third rail DC source or from a rectified AC source such as a catenary supply. These inverters control the voltage and frequency of the applied voltage on the induction motors to produce the necessary flux and torque.

When partially-enclosed, self-ventilating motors are used in severe weather conditions such as snow storms, moisture accumulates in the motor windings, and freezing and thawing cycles produce leakage currents to ground. These leakage currents become a problem which can be especially significant at the end of a layover period when the cars remain stationary and the warm motors are cooling down. If the snow melts and then re-freezes, re-melting of snow produces leakage currents when the cars start running again. The leakage currents are generally interpreted as ground faults during normal service, and the cars are disabled by a motor controller.

SUMMARY OF THE INVENTION

To prevent leakage currents in induction motors which result from freezing and thawing cycles, the present invention provides two techniques for preheating induction motors prior to departure of rail cars. In one embodiment, a large DC current is passed through an induction motor. In another embodiment, a single phase sinusoidal current is applied to the induction motor.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
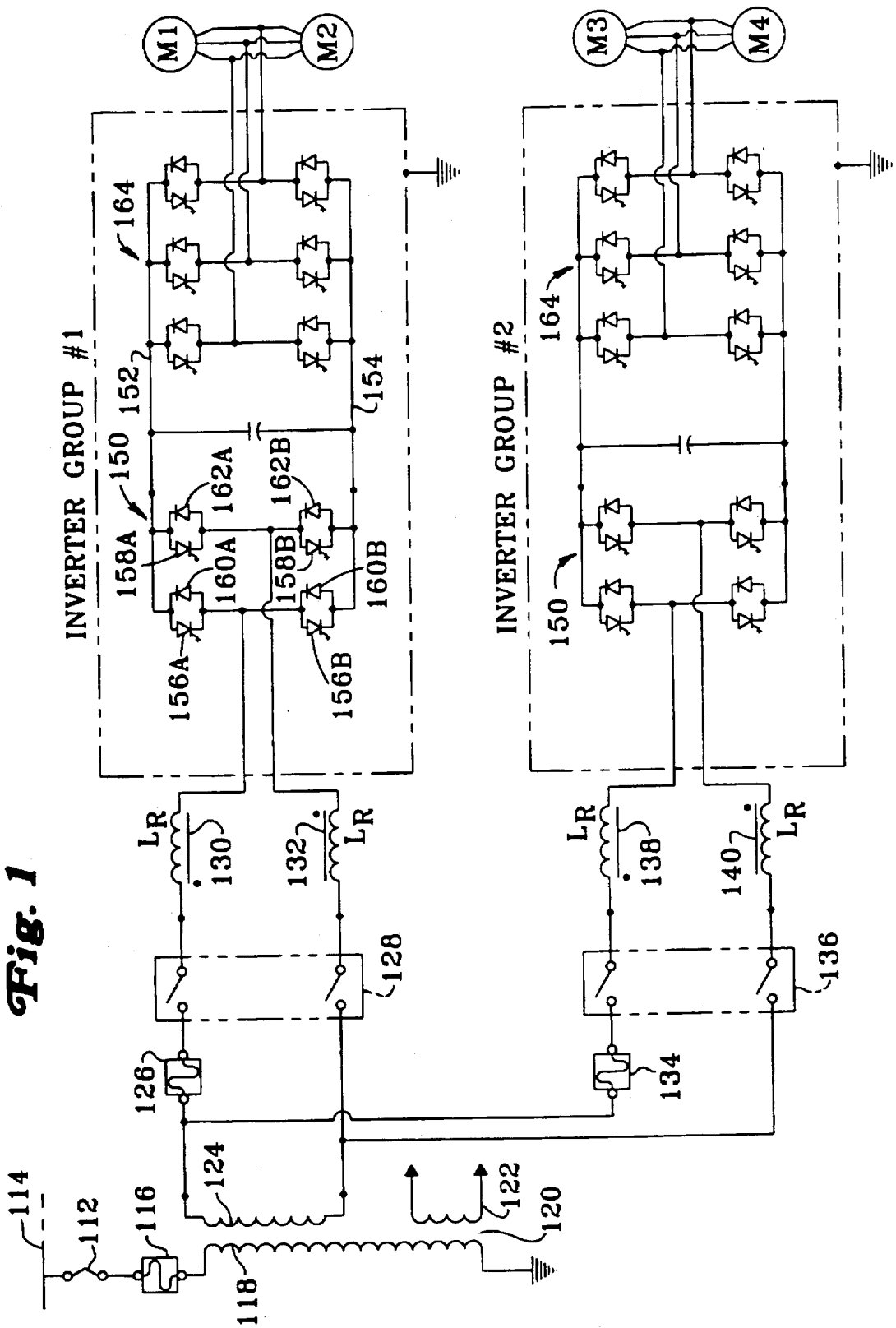
FIG. 1 is an overall electrical diagram of an electric power system for a transit car with which the present invention may be used.

Referring now to FIG. 1, there is shown an overall electrical diagram of an electric power system for a transit car with which the present invention may be used. The transit car typically includes a pantograph 112 which is adapted to make contact with an overhead catenary 114 which may carry 25,000 volts at 60 Hz. The voltage received at the pantograph is coupled through a fuse 116 to a first terminal of a primary winding 118 of a power transformer 120. A second terminal of the primary winding 118 is coupled to ground through the axles and wheels of the transit car to the rails on which the transit car operates. In the illustrated embodiment, the transformer 120 includes an auxiliary winding 122 which supplies voltage to an auxiliary power system and a main winding 124 which supplies power to drive the transit car. The main winding 124 is connected through a fuse 126, a circuit breaker 128 and a pair of line reactors 130 and 132 to a first inverter group 1 which supplies power to a pair of traction motors M1 and M2. The transformer winding 124 is also coupled through another fuse 134, circuit breaker 136 and line reactors 138 and 140 to a second inverter group 2 which supplies power to traction motors M3 and M4. Each of the circuits between the transformer winding 124 and the inverter groups 1 and 2 are substantially identical. While FIG. 1 illustrates a single winding 124 for powering both inverter groups, there may be some advantages in using a transformer 120 having separate secondary windings for each inverter group, i.e., two windings 124 with each winding connected to a respective one of the inverter groups 1 and 2.

Each inverter group comprises a rectifier and an inverter. The rectifier, indicated generally at 150, includes two pairs of series connected switching devices coupled across a DC link illustrated as a relatively positive bus 152 and a relatively negative bus 154. Each of the series connected pairs of switching devices, illustrated at 156A, 156B and 158A, 158B may comprise gate turn off (GTO) devices. Each of the devices 156 and 158 is bypassed by a reversely poled diode 160A, 160B and 162A, 162B coupled in parallel with the switching device. The DC busses 152 and 154 supply DC power to the inverter 164. Inverter 164 comprises a conventional three-phase inverter of a type well known in the art. In essence, each phase of the inverter is identical and comprises a pair of serially connected switching devices with reversing poled diodes connecting in parallel with each device. By gating the switching devices into conduction at predetermined times, a voltage is developed at the junction intermediate each switching device which approximates a sine wave. Each junction intermediate each pair of switching devices is connected to a respective phase winding of each of the motors M1 and M2. As can be seen from FIG. 1, the inverter group number 2 is identical to inverter group number 1 but has its output connected to respective phase windings of the motors M3 and M4. While two inverter groups are shown, it will be recognized that the two rectifiers could supply a common DC bus to which both inverters are connected.

Figure 2:
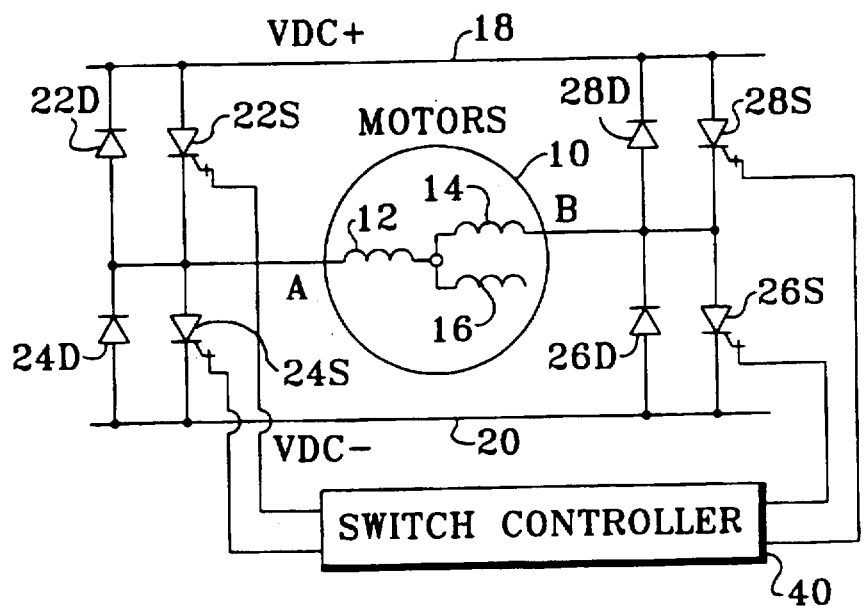
FIGS. 2 and 3 are circuit diagrams of motor embodiments that can be used in the present invention.
Figure 3:
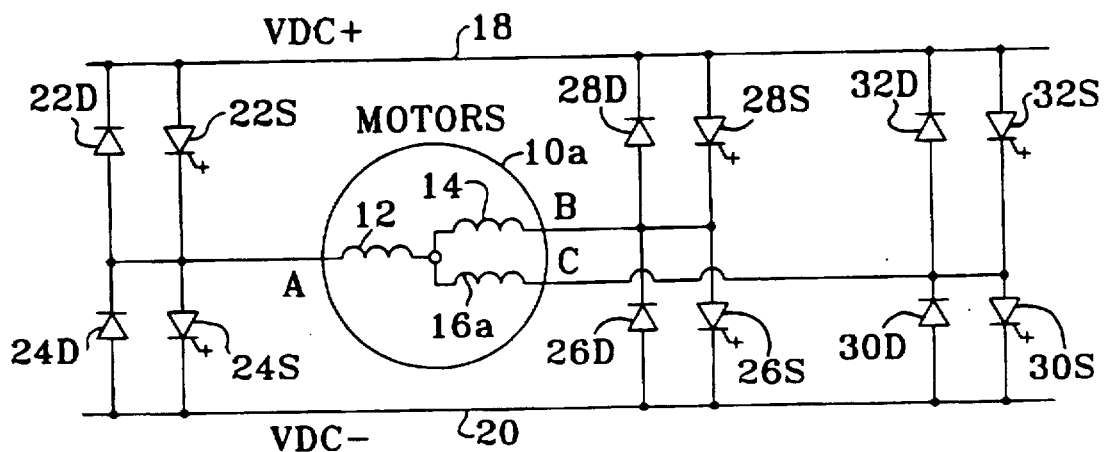

FIGS. 2 and 3 are circuit diagrams of motor embodiments that can be used in the present invention. In the present invention, DC power is switched ON and OFF through an inverter (such as shown in FIG. 1 as inverter 164, for example) in accordance with predetermined pulsing patterns to preheat the motors prior to starting the transit vehicle.

In FIGS. 2 and 3, a motor 10 (or 10a) includes three phase windings 12, 14, and 16 (or 16a) which can have respective currents IA, IB, and IC and are coupled to a DC power source with a $V_{DC+}$ line 18 and a $V_{DC-}$ line 20. In FIG. 2 only two windings 12 and 14 carry current at a given time, whereas in FIG. 3 all three windings 12, 14, and 16a can carry current at a given time. The motor is coupled to an inverter comprising switches and diodes with each winding of the motor being coupled to two diodes and two switches of the inverter. Phase A winding 12 is coupled to switches 22S and 24S and diodes 22D and 24D, phase B winding 14 is coupled to switches 26S and 28S and diodes 26D and 28D, and phase C winding 16a is coupled to switches 30S and 32S and diodes 30D and 32D. In one embodiment, the switches comprise GTO (gate turn off) thyristors as shown in FIGS. 2 and 3. The switches can be controlled by a switch controller 40 which, for example, may comprise a microprocessor.

Figure 4:
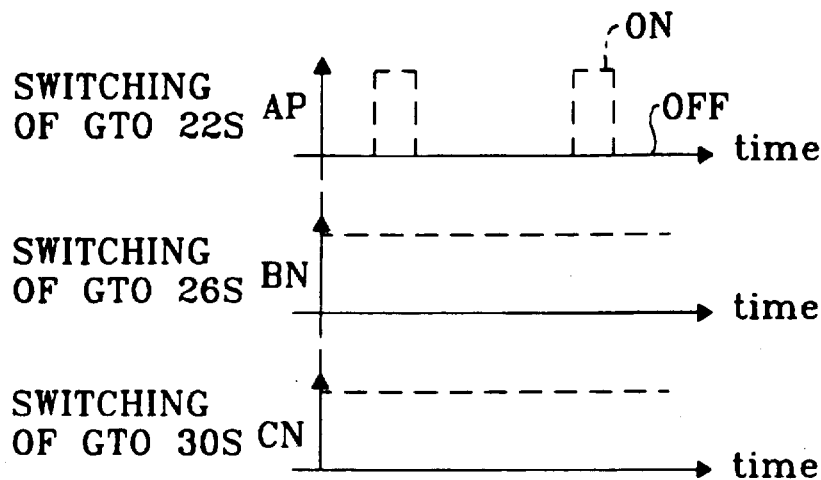
FIGS. 4 and 5 are graphs illustrating switching of phase current signals in accordance with the present invention.

Shown in FIG. 4 are graphs illustrating switching of GTO thyristors 22S, 26S, and 30S in accordance with one embodiment of the present invention. In this embodiment, only one of the GTO thyristors per phase is controlled and the other one is always turned off.

Figure 5:
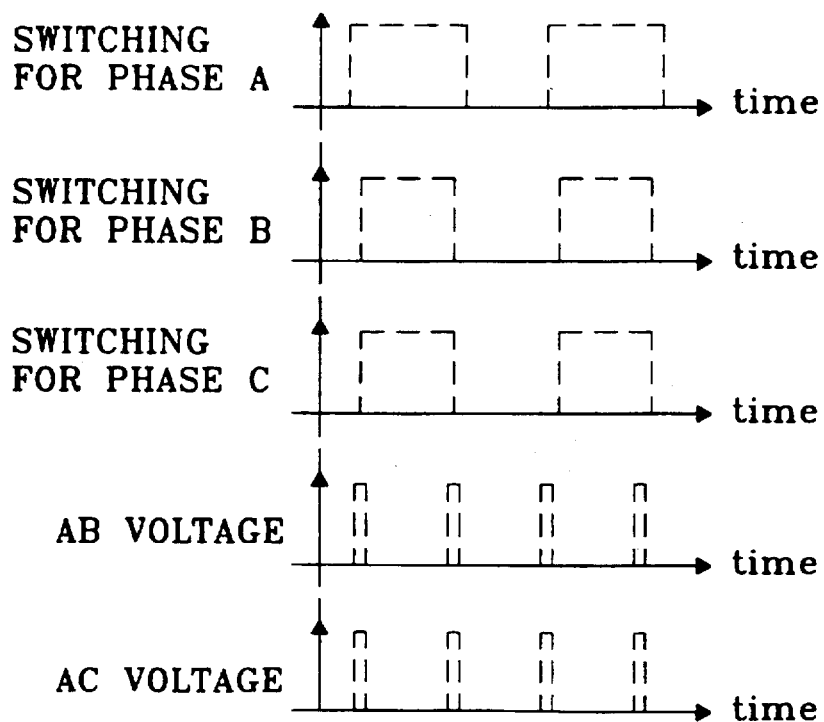

FIG. 5 shows the switching of phases A, B, and C in another embodiment of the invention. In this embodiment, when the signal is positive, the top GTO thyristor (22S, 28S, or 32S) is turned on and when it is 0, the bottom GTO thyristor (24S, 26S, or 30S) is turned on. In this case both GTO thyristors in a phase are controlled.

Although switchings are shown in each phase of the three phase windings for each of FIGS. 4 and 5, the structure of FIG. 2 would only include switching of two windings and thus current will flow through two windings only. The resulting current is substantially DC (if pulse width remains constant as shown in FIGS. 4 and 5) because the chopping frequency is high compared to the time constant determined by the motor resistance and inductance. In the embodiments of FIGS. 4 and 5, prior to the departure of rail cars, a large DC current is passed through respective induction motors when the cars are stationary. This DC current produces heat in the windings which melts the ice and evaporates the moisture. Thus, ground fault detections due to moisture are prevented during normal revenue service.

In the embodiment of FIG. 4, the DC current is produced and inverters are controlled by switch 22S which is coupled to $V_{DC+}$ and acts as a chopper and switches 26S and 30S which are coupled to $V_{DC-}$ to complete the circuit. In this embodiment, one of the three windings receives a sequence of pulses (is switched ON and OFF) whereas the second one (and the third one, if applicable), has a constant ON status. The minimum ON time of conventional high power inverter GTO thyristors can sometimes produce too much current. Whether the current will be too high for a particular application will depend on the amplitude of the DC link voltage, the frequency of the switching, and characteristics such as stator resistance of the specific induction motor.

The graph of FIG. 5 represents an alternate switching scheme. In this embodiment, during periods where each of the windings receives a pulse (is connected to $V_{DC+}$) or each of the windings receives no pulse (is connected to $V_{DC-}$), the net voltage applied to the motor will be zero. During periods were one winding receives a pulse (is connected to $V_{DC+}$) and one or more of the other windings do not receive a pulse (is connected to $V_{DC-}$), the resulting voltage will produce a substantially DC current (if the pulse width remains constant as shown in FIG. 5) due to the high frequency chopping which will create heat. Thus, in this embodiment, one of the windings has a different width of pulses (ON time) than the other of the windings. In each pulse of the embodiment of FIG. 5, for example, the length of time that the phase A winding is supplied is slightly longer than the length of time that the phase B and C windings are supplied. Hence the net voltage applied to the motor is determined by the difference in pulse width of the phase A winding and that of the phase B winding (and the phase C winding). Thus continuous variation is possible without regard to the minimum ON constraints of the GTO thyristor. For example, if the phase A winding is ON for 1000 microseconds and the phase B winding (and the phase C winding) are on for 999 microseconds, the net pulse width will be 1 microsecond and none of the pulse of the phase A winding or the phase B winding (or the phase C winding) are less than the minimum ON time of the GTO thyristor (for example, 100 microseconds). FIG. 5 shows the line A-to-B and line A-to-C voltages for illustration.

Figure 6:
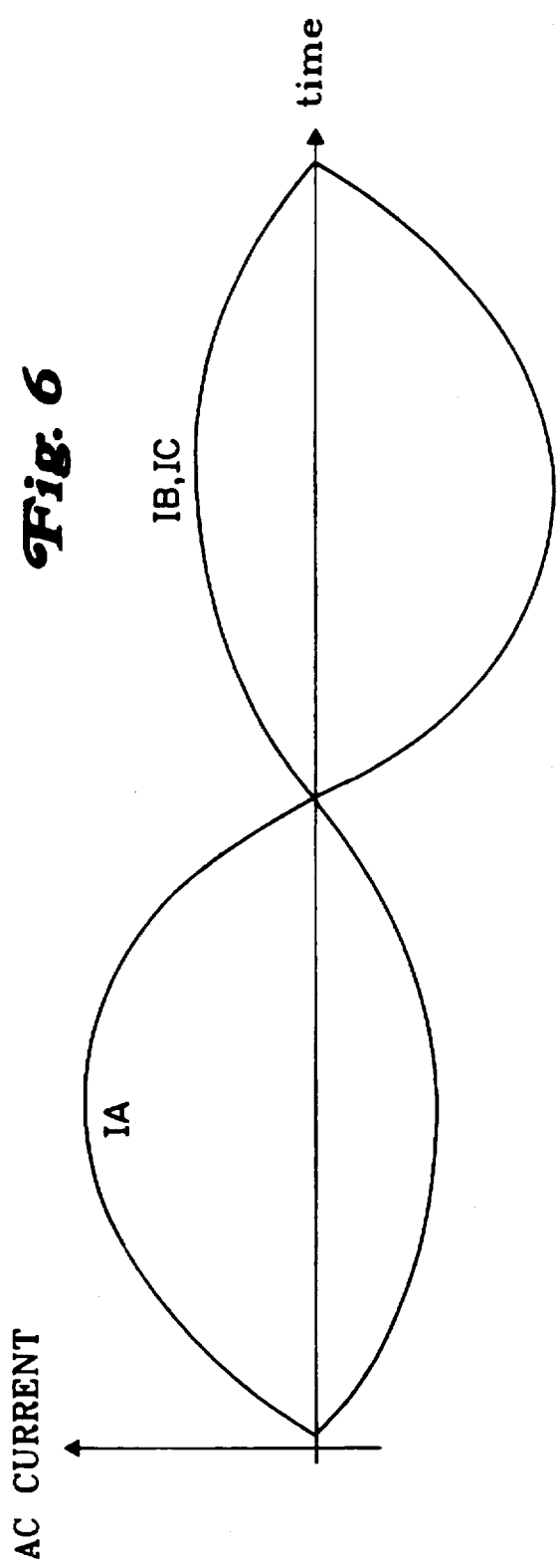
FIG. 6 is a graph illustrating sinusoidal current waveform with respect to time.

FIG. 6 is a graph illustrating current flowing in the embodiment of FIG. 3 in accordance with another embodiment of the present invention. In the embodiment of FIG. 6, a single phase AC current (a sinusoidal current generated by selectively applying pulses to the windings) is applied to the induction motor, prior to departure of the cars. A single phase sinusoidal current does not produce torque while the cars are stationary and requires less heating time because it can be produced over and above stator losses, rotor losses, and magnetizing losses.

Figure 7:
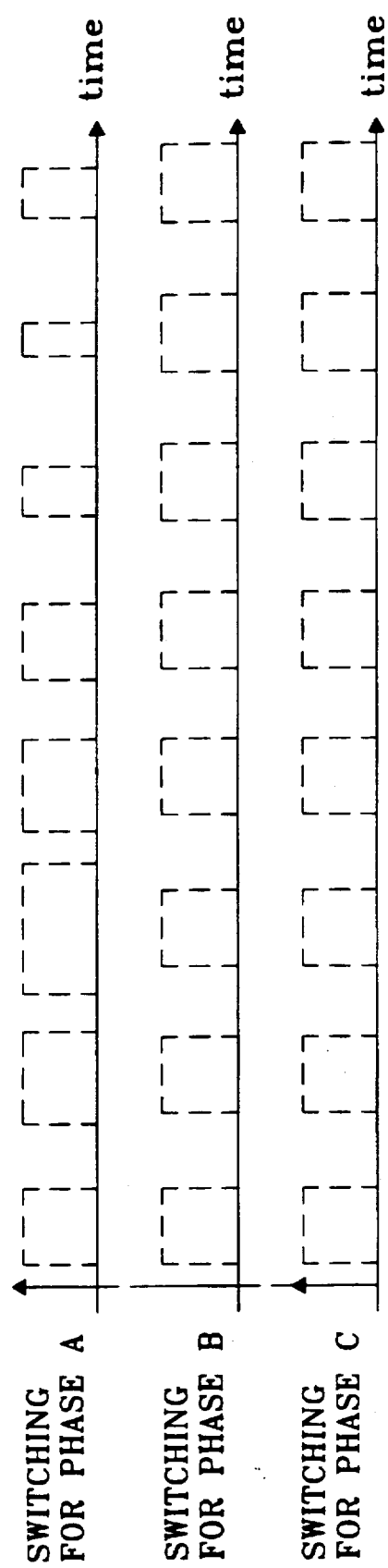
FIG. 7 is a graph illustrating another embodiment for switching of phase current signals in accordance with the present invention.

FIG. 7 is a graph illustrating an embodiment for switching of phases in accordance with the present invention to provide a firing pattern to generate the sinusoidal (AC) current. This embodiment, which is applicable to the three winding current embodiment of FIG. 3 wherein each winding receives pulses of ON time, is for purposes of example only. Sinusoidal pulse patterns can be generated regardless of whether two or three windings receive current. In the embodiment of FIG. 7, the pulse periods of the phase B and C windings are held constant, and the pulse period of the phase A winding is sinusoidally adjusted. In an alternative embodiment, more than one phase can have its pulse width adjusted to generate a single phase sinusoidal current to the motor. For example, while the phase A pulse width is increasing, the phase B pulse width can be decreasing.

To balance the losses in GTO thyristors, diodes, di/dt reactors, differential reactors, cables, and windings among the three phases, different combinations of the currents can be used and then changed after short periods of time. Thus, no one winding would be generating more losses than any other winding. For example, a combination of a long pulse for the phase A winding (A), a short pulse for the phase B winding (B), and a short pulse for the phase C winding (C) (the combination of FIG. 5) can be changed to a combination of short C, long A, and long B; long B, short C, and short A; short A, long B, and long C; long C, short A, and short B; or short B, long A, and long B. This can be extended to the embodiment of FIG. 4 by varying the phase which receives the pulsed voltage, and can also be applied to the embodiment of FIG. 7 by varying the phase or phases which receive adjusted pulse widths.

The length of preheating time can be selected based on ambient temperature, motor temperature, and/or an indication of a lack of leakage current. In an embodiment wherein motor temperature is selected as the criteria, the motor temperature can be estimated by a motor circuit resistance calculation, knowledge of the motor temperature at 0 degrees centigrade, and knowledge of the thermal coefficient of the winding.

The motor resistance can be calculated when current is flowing through the motor by measuring the average voltage across the winding and the average current through the winding. If desired, instead of measuring the average voltage, the average voltage can be calculated using the DC link voltage and the pulse width of each of the switches. For an embodiment such as in FIG. 2 wherein two windings receive current, the resistance calculated using the voltage and current provides a value that is twice the line-to-neutral resistance. For an embodiment such as in FIG. 3 wherein three windings receive current, the resistance calculated using the voltage and current provides a value that is 1.5 times the line-to-neutral resistance. When the resistance reaches a desired value (which can be chosen to result in a desired motor temperature), the heating can be discontinued. The formula for the resistance R2 at a given temperature T2 can be approximated by the following equation:

$$R2=R1(1+k(T2-T1)),$$

wherein R1 is the resistance at a known temperature T1 (such as 0 degrees centigrade) and k is the thermal coefficient of the material.

In one embodiment, each combination of pulse width switching processes is implemented for 20 seconds. The temperature is calculated by averaging the voltage and current for the last 19 seconds (to prevent transient effects) of each combination. The average resistance is obtained by averaging the resistance obtained in the last six combinations.

After a motor is preheated, the switches can be turned OFF. If a plurality of motors are being preheated, in a preferred embodiment, each set of switches for a respective motor is turned OFF when the preheating of that respective motor is completed. In some situations it may be desirable to wait until all of the motors have completed the preheating and to simultaneously turn off all the sets of switches. In one such embodiment, for example, the motor or motors which have completed preheating prior to an other motor can have a delay between each 20 second combination of pulse width switching processes which is longer than a delay for the motor which has not yet completed its preheating.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

I claim:

1. A method for removing moisture from an induction motor prior to motor operation, the motor having at least two phase windings with each phase winding coupled by a first respective parallel combination of a first switch and a first diode to a positive voltage line and a second respective parallel combination of a second switch and a second diode to a negative voltage line, the method comprising:

supplying voltage to the positive and negative voltage lines; and switching ON and OFF selected ones of the first and second switches to provide a current to preheat the induction motor prior to energizing the motor for normal operation.

2. The method of claim 1, wherein switching ON and OFF selected ones of the first and second switches to provide the current to preheat the induction motor comprises switching ON and OFF selected ones of the first and second switches to provide a substantially DC current to preheat the induction motor.

3. The method of claim 2, wherein switching ON and OFF selected ones of the first and second switches to provide the substantially DC current to preheat the induction motor comprises:

switching ON the second switch coupled to a first one of the at least two phase windings; and switching ON and OFF the first switch coupled to a second one of the at least two phase windings.

4. The method of claim 3, wherein, after switching ON the second switch coupled to the first one of the at least two phase and switching ON and OFF the first switch coupled to the second one of the at least two phase windings for a first period of time, for a second period of time, switching ON the second switch coupled to the second one of the at least two phase windings; and switching ON and OFF the first switch coupled to the first one of the at least two phase windings.

5. The method of claim 2, wherein switching ON and OFF selected ones of the first and second switches to provide the substantially DC current to preheat the induction motor comprises:

switching ON the first switch coupled to a first one of the at least two phase windings and OFF the second switch coupled to the first one of the at least two phase windings for a plurality of first pulse periods, and, between the plurality of first pulse periods, then switching OFF the first switch coupled to the first one of the at least two phase windings and ON the second switch coupled to the first one of the at least two phase windings; and switching ON the first switch coupled to a second one of the at least two phase windings and OFF the second switch coupled to the second one of the at least two phase windings for a plurality of second pulse periods, and, between the plurality of second pulse periods, then switching OFF the first switch coupled to the second one of the at least two phase windings and ON the second switch coupled to the second one of the at least two phase windings, the second pulse periods having a different width than the first pulse periods.

6. The method of claim 5, wherein, after a first sequence period of switching ON the first switch coupled to the first one of the at least two phase windings and OFF the second switch coupled to the first one of the at least two phase windings for the plurality of first pulse periods, and, between the plurality of first pulse periods, then switching OFF the first switch coupled to the first one of the at least two phase windings and ON the second switch coupled to the first one of the at least two phase windings; and switching ON the first switch coupled to the second one of the at least two phase windings and OFF the second switch coupled to the second one of the at least two phase windings for the plurality of second pulse periods, and, between the plurality of second pulse periods, then switching OFF the first switch coupled to the second one of the at least two phase windings and ON the second switch coupled to the second one of the at least two phase windings, for a second time sequence period, switching ON the first switch coupled to the second one of the at least two phase windings and OFF the second switch coupled to the second one of the at least two phase windings for a plurality of third pulse periods, and, between the plurality of third pulse periods, then switching OFF the first switch coupled to the second one of the at least two phase windings and ON the second switch coupled to the second one of the at least two phase windings; and switching ON the first switch coupled to the first one of the at least two phase windings and OFF the second switch coupled to the first one of the at least two phase windings for a plurality of fourth pulse periods, and, between the plurality of fourth pulse periods, then switching OFF the first switch coupled to the first one of the at least two phase windings and ON the second switch coupled to the first one of the at least two phase windings, the fourth pulse periods having a different width than the third pulse periods.

7. The method of claim 1, wherein switching ON and OFF selected ones of the first and second switches to provide the current to preheat the induction motor comprises switching ON and OFF selected ones of the first and second switches to provide a substantially sinusoidal current to preheat the induction motor.

8. The method of claim 7, wherein switching ON and OFF selected ones of the first and second switches to provide a substantially sinusoidal current to preheat the induction motor comprises:

switching ON the first switch coupled to a first one of the at least two phase windings and OFF the second switch coupled to the first one of the at least two phase windings for a plurality of first pulse periods, and, between the plurality of first pulse periods, then switching OFF the first switch coupled to the first one of the at least two phase windings and ON the second switch coupled to the first one of the at least two phase windings; and switching ON the first switch coupled to a second one of the at least two phase windings and OFF the second switch coupled to the second one of the at least two phase windings for a plurality of second pulse periods, and, between the plurality of second pulse periods, then switching OFF the first switch coupled to the second one of the at least two phase windings and ON the second switch coupled to the second one of the at least two phase windings, the second pulse periods having a varying width to create a sinusoidal pulse pattern to preheat the induction motor.

9. The method of claim 8, wherein, after a first time sequence period of switching ON the first switch coupled to the first one of the at least two phase windings and OFF the second switch coupled to the first one of the at least two phase windings for a plurality of first pulse periods, and, between the plurality of first pulse periods, then switching OFF the first switch coupled to the first one of the at least two phase windings and ON the second switch coupled to the first one of the at least two phase windings; and switching ON the first switch coupled to the second one of the at least two phase windings and OFF the second switch coupled to the second one of the at least two phase windings for a plurality of second pulse periods, and, between the plurality of second pulse periods, then switching OFF the first switch coupled to the second one of the at least two phase windings and ON the second switch coupled to the second one of the at least two phase, for a second time sequence period, switching ON the first switch coupled to the second one of the at least two phase windings and OFF the second switch coupled to the second one of the at least two phase windings for a plurality of third pulse periods, and, between the plurality of third pulse periods, then switching OFF the first switch coupled to the second one of the at least two phase windings and ON the second switch coupled to the second one of the at least two phase windings; and switching ON the first switch coupled to the first one of the at least two phase windings and OFF the second switch coupled to the first one of the at least two phase windings for a plurality of fourth pulse periods, and, between the plurality of fourth pulse periods, then switching OFF the first switch coupled to the first one of the at least two phase windings and ON the second switch coupled to the first one of the at least two phase windings, the fourth pulse periods having a varying width to create a sinusoidal pulse pattern to preheat the induction motor.

10. An apparatus for removing moisture from an induction motor having at least two phase windings with each phase winding coupled by a first respective parallel combination of a first switch and a first diode to a positive voltage line and a second respective parallel combination of a second switch and a second diode to a negative voltage line, the method comprising:

a voltage source for supplying voltage to the positive and negative voltage lines; and a switch controller for switching ON and OFF selected ones of the first and second switches to provide a current to preheat the induction motor prior to energizing the motor for normal running operation.

11. The apparatus of claim 10, wherein the switch controller is adapted to provide a substantially DC current to preheat the induction motor.

12. The apparatus of claim 11, the switch controller includes:

means for switching ON the second switch coupled to a first one of the at least two phase windings; and means for switching ON and OFF the first switch coupled to a second one of the at least two phase windings.

13. The apparatus of claim 11, wherein the switch controller includes:

means for switching ON the first switch coupled to a first one of the at least two phase windings and OFF the second switch coupled to the first one of the at least two phase windings for a plurality of first pulse periods, and, between the plurality of first pulse periods, then switching OFF the first switch coupled to the first one of the at least two phase windings and ON the second switch coupled to the first one of the at least two phase windings; and means for switching ON the first switch coupled to a second one of the at least two phase windings and OFF the second switch coupled to the second one of the at least two phase windings for a plurality of second pulse periods, and, between the plurality of second pulse periods, then switching OFF the first switch coupled to the second one of the at least two phase windings and ON the second switch coupled to the second one of the at least two phase windings, the second pulse periods having a different width than the first pulse periods.

14. The apparatus of claim 10, wherein the switch controller is adapted to provide a substantially sinusoidal current to preheat the induction motor.

15. The apparatus of claim 14, wherein the switch controller includes:

means for switching ON the first switch coupled to a first one of the at least two phase windings and OFF the second switch coupled to the first one of the at least two phase windings for a plurality of first pulse periods, and, between the plurality of first pulse periods, then switching OFF the first switch coupled to the first one of the at least two phase windings and ON the second switch coupled to the first one of the at least two phase windings; and means for switching ON the first switch coupled to a second one of the at least two phase windings and OFF the second switch coupled to the second one of the at least two phase windings for a plurality of second pulse periods, and, between the plurality of second pulse periods, then switching OFF the first switch coupled to the second one of the at least two phase windings and ON the second switch coupled to the second one of the at least two phase windings, the second pulse periods having a varying width to create a sinusoidal pulse pattern to preheat the induction motor.

* * * * *